United States Patent
Xu et al.

[11] Patent Number: 6,072,297
[45] Date of Patent: Jun. 6, 2000

[54] VIBRATION DETECTION AND CONTROL FOR A VEHICLE DRIVETRAIN

[75] Inventors: Jack H. Xu, Troy; Kenneth James Farkas, Dearborn, both of Mich.

[73] Assignee: Ecostar Electric Drive Systems, L.L.C., Dearborn, Mich.

[21] Appl. No.: 08/926,415

[22] Filed: Sep. 9, 1997

[51] Int. Cl.[7] .................................................. G05B 5/01
[52] U.S. Cl. .......................... 318/630; 318/611; 318/139
[58] Field of Search ................................. 318/139, 434, 318/432, 630, 254, 611, 623, 460; 310/51; 187/292

[56] References Cited

U.S. PATENT DOCUMENTS

| | | | |
|---|---|---|---|
| 4,042,869 | 8/1977 | Eickelberg et al. | 318/630 |
| 4,507,595 | 3/1985 | Rozsa | 318/630 |
| 4,513,231 | 4/1985 | Kuno et al. | 318/341 |
| 5,008,605 | 4/1991 | Ohara et al. | 318/630 |
| 5,213,177 | 5/1993 | May | 180/197 |
| 5,448,976 | 9/1995 | Treinies et al. | 123/419 |
| 5,759,133 | 6/1998 | Treinies et al. | 477/110 |
| 5,994,859 | 11/1999 | Deng et al. | 318/432 |

*Primary Examiner*—Bentsu Ro
*Attorney, Agent, or Firm*—Mark S. Sparschu

[57] ABSTRACT

The present invention provides vibration control for a vehicle drivetrain. In one embodiment of the present invention, a vibration control method comprises generating a speed signal representing a rotational speed of the drivetrain. The method further includes half-wave rectifying the speed signal to generate a first signal. Also, the method comprises inverting the speed signal and half-wave rectifying the inverted signal to generate a second signal. Also, the method includes low-pass filtering the first signal to generate a third signal and low-pass filtering the second signal to generate a fourth signal. In addition, the method comprises selecting a minimum of the third and fourth signals to generate a fifth signal.

7 Claims, 2 Drawing Sheets

VIBRATION DETECTION AND CONTROL FOR A VEHICLE DRIVETRAIN

BACKGROUND OF THE INVENTION

1. Field of the Invention

The present invention relates to detecting and controlling vibration in the drivetrain of a motor vehicle.

2. Description of the Related Art

An electric vehicle's drivetrain can use a simpler transmission than a vehicle driven by an internal combustion engine. This ability to use a simpler transmission is due to an electric motor's ability to deliver the requisite torque over a wider speed range than an internal combustion engine. Therefore, a simpler transmission, such as a single-speed transmission, can be used.

Such a single-speed transmission may have backlash between its gears. Backlash is a small amount of travel of a driving gear before it meshes with a driven gear. Impact between the gears due to such backlash can introduce oscillation into the vehicle's drivetrain. The oscillation can be most pronounced when the vehicle is at rest with its driving wheels immobilized, such as with the vehicle's parking brake applied or with the driving wheels against a curb. The oscillation may be large enough to be felt by the driver of the vehicle and can thus cause dissatisfaction with the vehicle.

Therefore, a system and method which can reduce the low-vehicle-speed oscillation just described can provide advantages over the prior art.

SUMMARY OF THE INVENTION

The present invention provides a vibration control method for a vehicle drivetrain. The method comprises generating a speed signal representing a rotational speed of the drivetrain and inverting and half-wave rectifying the speed signal to generate a first signal.

The present invention also provides a second vibration control method for a vehicle drivetrain. The method comprises generating a speed signal representing a rotational speed of the drivetrain. The method further includes half-wave rectifying the speed signal to generate a first signal. Additionally, the method includes inverting and half-wave rectifying the speed signal to generate a second signal. Also, the method includes low-pass filtering the first signal to generate a third signal and low-pass filtering the second signal to generate a fourth signal. In addition, the method comprises selecting a minimum of the third and fourth signals to generate a fifth signal.

The present invention also provides a vibration control system for a vehicle drivetrain. The system comprises a speed sensor in a sensing relationship with the drivetrain and adapted to generate a signal representing a rotational speed of the drivetrain. In addition, the system includes a first half-wave rectifier coupled to half-wave rectify the speed signal to generate a first signal. The system also comprises a signal inverter and a second half-wave rectifier coupled to invert and half-wave rectify the speed signal to generate a second signal. Further, the system includes a first low-pass filter coupled to low-pass filter the first signal to generate a third signal and a second low-pass filter coupled to low-pass filter the second signal to generate a fourth. The system also includes a minimum signal selector coupled to generate a fifth signal which represents a minimum of the third and fourth signals.

The present invention assists in control of vehicle drivetrain vibration, particularly vibration of electric vehicle drivetrains at low vehicle speed. In doing so, the present invention provides advantages over the prior art by increasing customer satisfaction with the vehicle.

DETAILED DESCRIPTION OF THE PREFERRED EMBODIMENT

Figure 1:
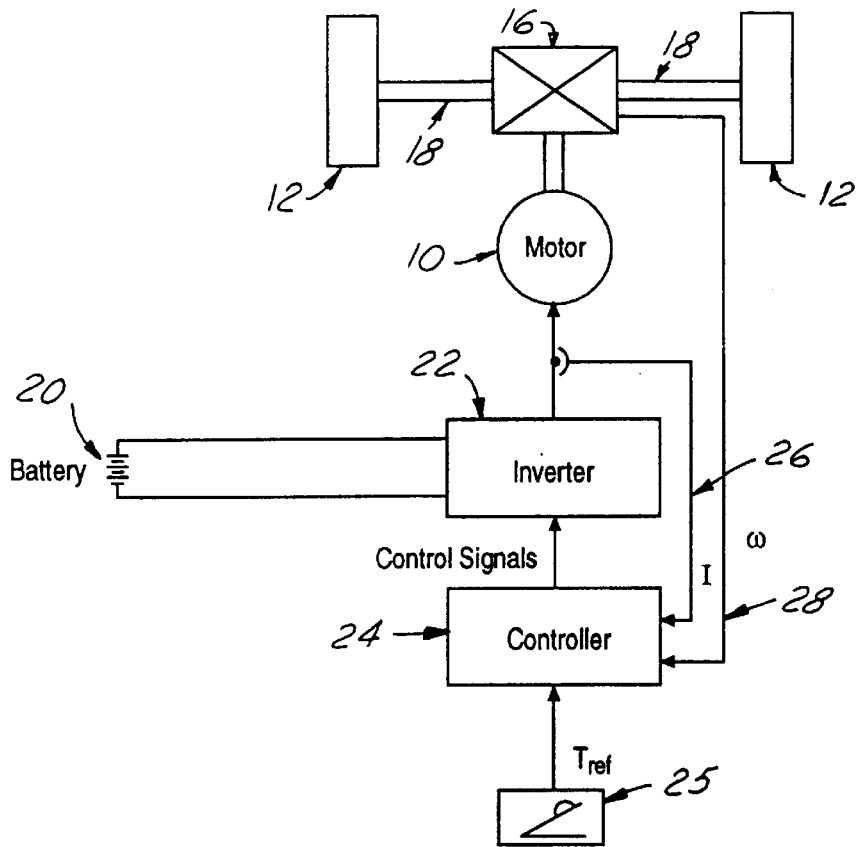
FIG. 1 is a block diagram of the powertrain of an electric vehicle.

Refer first to FIG. 1, a diagram of the powertrain of an electrically-propelled vehicle. Mechanical power for motivating the vehicle is provided by a motor 10. The output of motor 10 is provided to wheels 12 by a drivetrain comprising transmission 16 and output shafts 18. Because motor 10 can supply its required torque over a very wide speed range, transmission 16 in an electric vehicle typically comprises simple single-speed gearing.

The powertrain of the vehicle further includes battery 20, which provides power for motor 10 through inverter 22. Inverter converts the DC electrical power from battery 20 into AC, typically three-phase, for motor 10. An electronic controller 24 controls the electronic switches in inverter 22 which convert DC into AC. Controller 24 uses as an input the signal $T_{ref}$ from an accelerator pedal position sensor 25, which indicates the torque commanded by the vehicle's driver. Feedback signals to controller 24 include current signal I and output shaft speed $\omega$. These feedback signals are generated by appropriate sensors.

Figure 2:
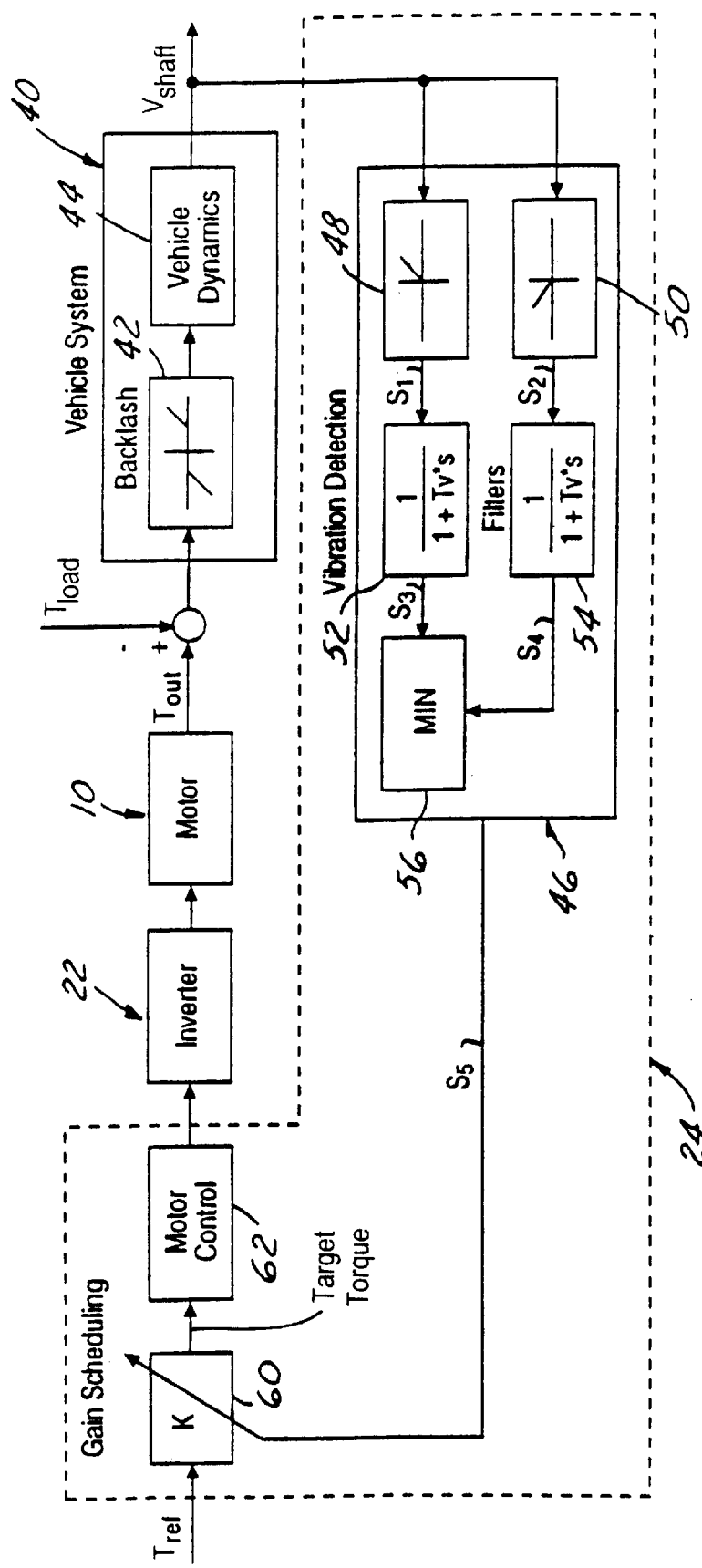
FIG. 2 is a block diagram showing more detail of controller 24 according to one embodiment of the present invention.

Refer now additionally to FIG. 2. FIG. 2 illustrates that the output torque of the motor, $T_{out}$, interacts with the load torque $T_{load}$, which is a counter torque due to the vehicle load. The net torque then interacts with the vehicle system 40, which is represented by gear backlash 42 in transmission 16 and vehicle dynamics 44. The result is a rotational speed $V_{shaft}$ of output shafts 18.

The signal $V_{shaft}$ is provided to vibration detection block 46. At block 48, the negative-going portions of $V_{shaft}$ are eliminated (i.e., the $V_{shaft}$ signal is "half-wave rectified"), to generate a signal $s_1$. At block 50, the $V_{shaft}$ signal is inverted and then the negative-going portion of the resulting signal is eliminated, to generate a signal $s_2$. Signals $s_1$ and $s_2$ are then low-pass filtered at blocks 52 and 54, respectively, to generate signals $s_3$ and $s_4$. At block 56, then, a signal is generated which represents the minimum of signals $s_3$ and $s_4$. That is, wherever $s_3$ is of lesser magnitude than $s_4$, the output of block 56 will be equal to $s_3$. Wherever $s_4$ is of lesser magnitude, then, the output of block 56 will be equal to $s_4$. The amplitude of the resulting signal $s_5$ is a measure of the strength of the vibration of the drivetrain.

Signal $s_5$ is used to adaptively control gain K at block 60. The output of block 60 is the target torque to which motor control block 62 will control motor 10. Motor control block 62 represents any appropriate motor control logic conventional to those skilled in the art. The larger the amplitude of signal $s_5$ (i.e., the larger the drivetrain vibration), the more K is reduced to eliminate the vibration.

Figure 3:
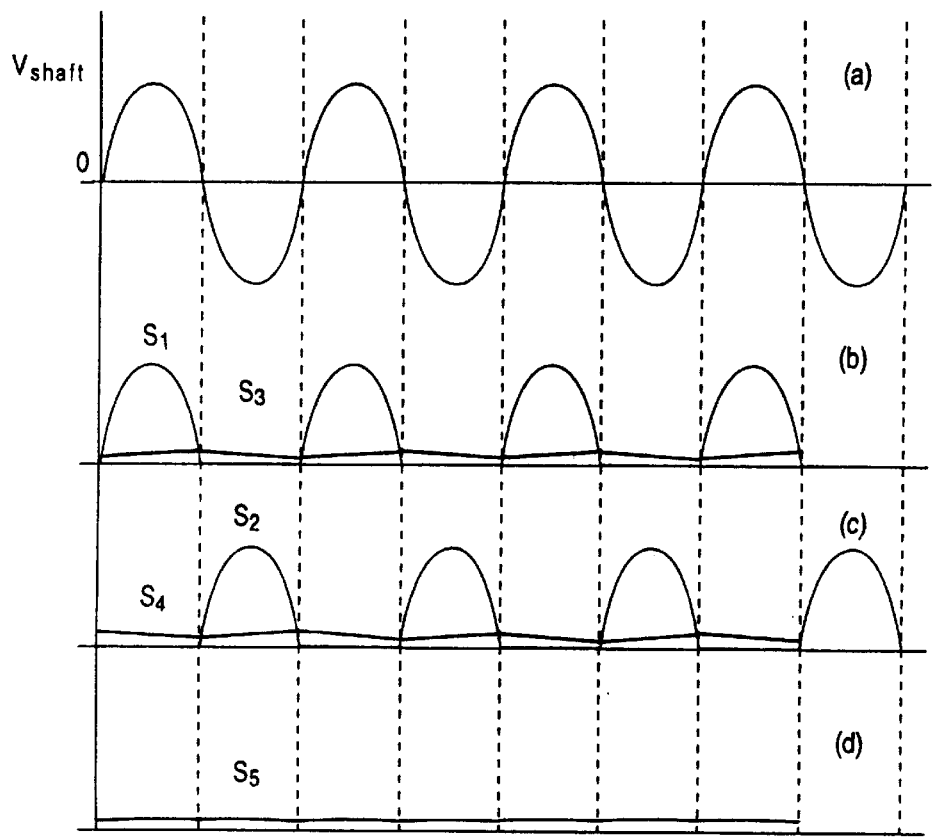
FIG. 3 illustrates several of the signals in the diagram of FIG. 2.

Refer now additionally to FIG. 3 for an example of the signals just described. For simplicity of illustration, we will assume that $V_{shaft}$ is sinusoidal, though the present invention has been demonstrated to be effective without this assumption. Note in curve (a) that $V_{shaft}$ oscillates about zero speed, the situation which gives rise to the problem discussed in the Background section of this specification. Curve (b) illustrates signal $s_1$, which is $V_{shaft}$ with the negative-going portion removed. Curve (b) also shows $s_3$, the signal resulting when $s_1$ is low-pass filtered by filter 52.

Curve (c), then, shows signal $s_2$, which is $V_{shaft}$ after having been inverted and having the resulting negative-going portion removed. Curve (c) also illustrates signal $s_4$, the signal resulting when $s_2$ is low-pass filtered by filter 54. Curve (d) shows the minimum of signals $s_3$ and $s_4$. One can understand that the magnitude of signal $s_5$ is proportional to the amplitude of the oscillation of signal $V_{shaft}$. Signal $s_5$ is then used to adaptively adjust gain K at block 60. A larger amplitude of signal $s_5$ will result in a lower gain K, to damp out the oscillation being experienced at output shafts 18. When signal $s_5$ is zero, K is at a nominally-selected value for normal control of the vehicle's powertrain.

A clear advantage provided by the method and system described herein is that when $V_{shaft}$ has an appreciable DC component (i.e., when the vehicle has launched and has reached an appreciable speed), signal $s_5$ will be zero and will therefore not affect gain K. That is, this method and system will be operative only when the vehicle is near zero speed. That $s_5$ will be zero when the vehicle has appreciable speed will be understood when one realizes that $V_{shaft}$ will always be positive in such a case, having no negative-going portion. Therefore, $s_2$, resulting from the inversion and half-wave rectification of $V_{shaft}$, will always be zero. Signal $s_5$, the minimum of signals $s_3$ and $s_4$, will also always be zero.

Refer again to FIG. 2. The functions of vibration detection block 46 may be carried out by analog circuitry or digitally, though the preferred implementation is digital. Once the signal $V_{shaft}$ is sampled at an appropriate rate, the half-wave rectification function of blocks 48 and 50 can be performed simply by setting all negative values of the appropriate signal to zero. The inversion function of block 50 can be performed simply by performing an arithmetic negation on each of the values of the digitized $V_{shaft}$ signal. The filtering of blocks 52 and 54 can be according to any well-known digital filtering algorithms. The minimum selection function of block 56 can be a simple comparison of the magnitudes of the values of signals $s_3$ and $s_4$, setting the values of signal $s_5$ to be the smaller of the compared values. Gain scheduling of block 60 is also preferably digital.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A vibration control method for a vehicle drivetrain, said method comprising:
   generating a speed signal representing a rotational speed of said drivetrain; and
   inverting and half-wave rectifying said speed signal to generate a first signal ($s_2$); and
   adjusting a torque command for said drivetrain as a function of said first signal ($s_2$).

2. A vibration control method as recited in claim 1, further comprising low-pass filtering said first signal ($s_2$) to generate a second signal ($s_4$).

3. A vibration control method as recited in claim 2, further comprising adjusting a torque command for said drivetrain as a function of said second signal ($s_4$).

4. A vibration detection method for a vehicle drivetrain, said method comprising:
   generating a speed signal representing a rotational speed of said drivetrain;
   half-wave rectifying said speed signal to generate a first signal;
   inverting and half-wave rectifying said speed signal to generate a second signal;
   low-pass filtering said first signal to generate a third signal;
   low-pass filtering said second signal to generate a fourth signal;
   selecting a minimum of said third and fourth signals to generate a fifth signal.

5. A method as recited in claim 4, further comprising adjusting a torque command for said drivetrain as a function of said fifth signal.

6. A vibration detected system for a vehicle drivetrain, said system comprising:
   a speed sensor in a sensing relationship with said drivetrain and adapted to generate a signal representing a rotational speed of said drivetrain;
   a first half-wave rectifier coupled to half-wave rectify said speed signal to generate a first signal;
   a signal inverter and half-wave rectifier coupled to invert and half-wave rectify said speed signal to generate a second signal;
   a first low-pass filter coupled to low-pass filter said first signal to generate a third signal;
   a second low-pass filter coupled to low-pass filter said second signal to generate a fourth signal; and
   a minimum signal selector coupled to generate a fifth signal which represents a minimum of said third and fourth signals.

7. A system as recited in claim 6, further comprising a gain selector responsively coupled to said minimum speed selector to adjust a torque command for said drivetrain as a function of said fifth signal.

* * * * *